April 21, 1964  S. F. JUDD  3,129,656
MULTIPLE COMPRESSION BALING PRESS AND SHEAR
Filed Sept. 3, 1958  2 Sheets-Sheet 1
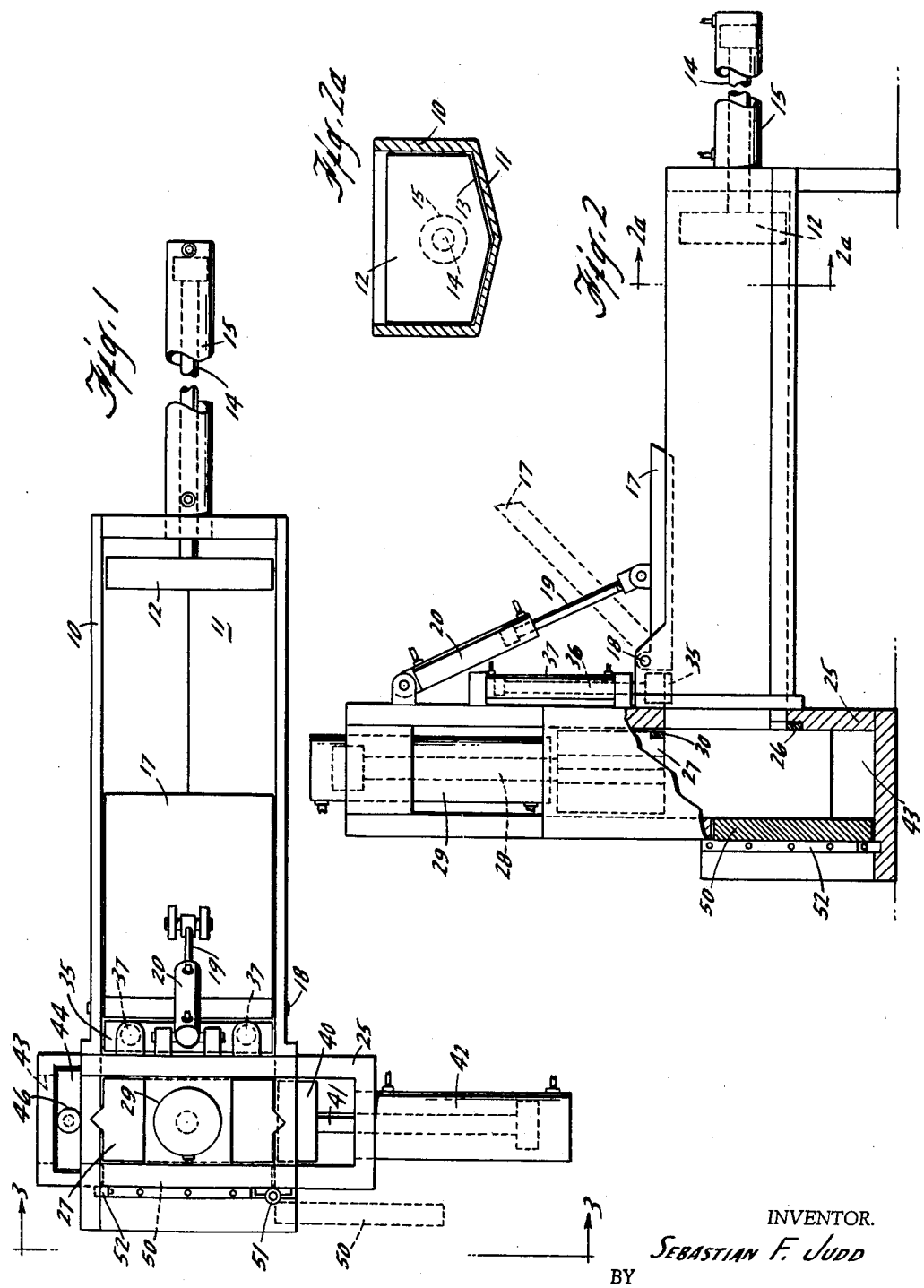
INVENTOR.
SEBASTIAN F. JUDD
BY
Wheeler, Wheeler & Wheeler
ATTORNEYS

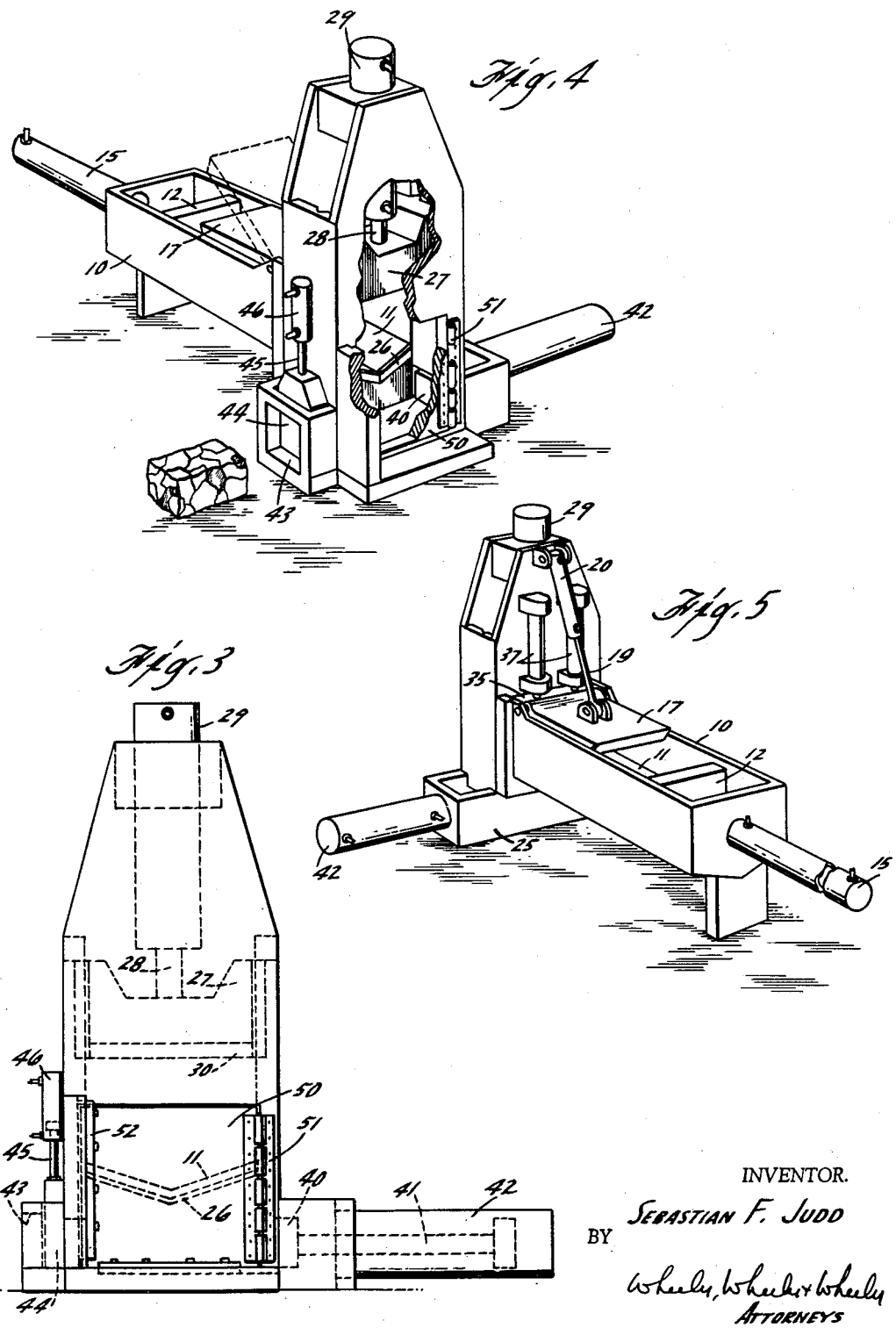

United States Patent Office 3,129,656
Patented Apr. 21, 1964

3,129,656
MULTIPLE COMPRESSION BALING PRESS
AND SHEAR
Sebastian F. Judd, 2437 N. 91st St., Milwaukee, Wis.
Filed Sept. 3, 1958, Ser. No. 758,758
5 Claims. (Cl. 100—98)

This invention relates to a multiple compression baling press and shear.

A shear blade is disposed in the bottom of a charging box at an end thereof which opens into the baling chamber. A cooperating shear blade is carried by a shear ram head which reciprocates to compress the material in the baling chamber. The baling chamber has a shear gate which can be opened not only to give access to sheared material, but to permit such material to project over a charging box knife to a length greater than could otherwise be accommodated within the width of the baling chamber.

The charging box has a holddown ram with a head disposed between its cover and the baling chamber and immediately adjacent the stationary shear knife. Thus, the holddown ram coacts with the bottom of the charging box to hold the material in the charging chamber pending the action of the shearing ram thereon.

When the device is used as a baling press, the material is loaded into the charging box with the tamping cover raised. The tamping cover then descends to compact the material in the charging box. The charging ram head then advances longitudinally of the charging box to deliver the material into the baling chamber. The operator may control the size of the bale by interrupting the charging head movement at any point. As the shear ram head descends in the baling chamber, it will shear off such portion of the work as lies across the stationary shear blade, the bale being formed only from such portion of the work as has been delivered over the blade and into the baling chamber. With the shear ram head in its lowermost position across the end of the charging box, a compression ram may be advanced transversely of the baling chamber at the same time that the charging ram head is being retracted and the tamper cover raised to receive another charge. When compression is complete, the finished bale is ejected through a gate in the baling chamber. It will, of course, be understood that the shear gate of the baling chamber, normally open during use of the device for shearing purposes, will be closed to constitute a fixed wall of the baling chamber during press operation.

In the shearing operation, the controlled advance of the charging ram will control the advance of successive lengths of the work which are to be sheared in the descent of the shear ram head. Thus, both the shear blades and the charging ram are used in the shearing operation as well as in the bale forming press operation. The holddown is normally used only in the shear operation but may also be used in press operation.

The device is designed to be erected at and above ground level, requiring no pit. Yet the sides of its charging box are low enough to permit the material to be charged into the box readily and without the use of an elevator or hoist.

In the drawings:

FIG. 1 is a plan view of an apparatus embodying the invention.

FIG. 2 is a view of the apparatus in side elevation with parts broken away to a longitudinal section.

FIG. 2a is a view taken in section on the line 2a—2a of FIG. 2.

FIG. 3 is a view of the apparatus in end elevation.

FIG. 4 is a diagrammatic view of the apparatus in front perspective, portions of the front being broken away.

FIG. 5 is a diagrammatic view of the apparatus on a somewhat reduced scale in rear perspective.

It will be understood that all of the illustrations are diagrammatic, details of the usual reinforcing means and tension bars being omitted in order not to confuse the disclosure.

The charging box 10 desirably has a V-shaped bottom 11 as best shown in FIGS. 2a and 4. The charging ram head 12 is complementary in cross section to the charging box, having a V-shaped bottom 13 complementary to the V-shaped bottom 11 of the box. The charging ram head is operated in the usual manner by the ram 14 reciprocable in the charging ram cylinder 15.

Hinged to overlie any desired portion of the length of the charging box 10 is a tamper cover 17 oscillatable on the axis of the pintle 18 between the dotted and full line positions shown in FIG. 2. The tamper cover and its pintle are spaced somewhat from the delivery end of the box for reasons which will hereinafter be made apparent. The tamper cover is raised and lowered by hydraulic reciprocation of the tamper ram 19 in the cover cylinder 20.

At the delivery end of the charging box 10 is the baling chamber 25. At the margin of the end of the box bottom 11 is a V-shaped knife 26 constituting a part of the charging box bottom and across which material is projected by the charging ram head 12 into the baling chamber. Reciprocable vertically in the baling chamber is the shear ram head 27 operated by hydraulic movement of the shear ram 28 in the shear cylinder 29. The horizontal cross section of the shear ram head corresponds with the cross section of the baling chamber. The knife 30 carried by the lower rear margin of the shear ram head is movable operatively across the stationary shear knife 26 at the end of the bottom of the charging box to sever any material projecting from the charging box into the path of downward movement of the shear ram head 27 in the baling chamber.

A holddown ram head 35 is desirably reciprocable vertically across the delivery end of the charging box immediately behind the stationary shear knife 26, being actuated by the hydraulic movement of the holddown rams 36 in the holddown ram cylinders 37.

The final compression is achieved, in the instant device, by movement of the compression ram head 40 across the bottom of the baling chamber 25 and beneath the lowered shear ram head 27 to compress into a bale the material which is held under compression in the bottom of the baling chamber by the shear ram head. Actuation of the compression ram head 40 is achieved by hydraulic movement of the compression ram 41 in the compression cylinder 42.

Desirably the end of the baling chamber is ported at 43 in the path of movement of the compression ram head, and the port is normally closed during a baling operation by the ejection gate 44. When the bale has been completed, this gate can be raised by the gate ram 45 operated hydraulically in cylinder 46.

A portion of the wall of the baling chamber which is opposite the end of the charging box is desirably arranged to be removed or opened. This wall portion is termed a shear gate and identified by reference character 50. It may be supported by heavy hinges at 51 at one side of the opening and anchored by cleats 52 at the other side of the opening. When the cleats are removed, the shear gate may be swung to the open position shown in dotted lines in FIG. 1 from the closed position shown in full lines in FIGS. 2, 3 and 4.

The operation of the device as a shear will first be described.

With the tamper cover elevated at least to the height indicated at dotted lines in FIG. 2 and the charging ram head retracted to the position shown in FIG. 1, and the shear gate desirably open in the dotted line position of FIG. 1, the material to be cut into lengths is placed in the bottom of the charging box. Assuming such material to be rods or bars or the like, it will tend to be aligned in the charging box by the oblique inclination of opposite sides of the box bottom. Advance of the charging ram head in the charging box to a predetermined position will advance the workpieces longitudinally of the charging box to project to any desired extent beyond stationary shear knife 26. As soon as the workpieces have been advanced to the positions at which shearing cut is desired, the admission of hydraulic pressure to the cylinders 37 will cause the holddown rams 36 to be actuated downwardly to force the holddown ram head 35 into clamping engagement with the work to hold the workpieces against the bottom of the charging box.

The shear ram head will now be lowered by admitting hydraulic pressure to the shear cylinder 29 above the ram 28. This will cause the shear knife 30 to move with a shearing cut across the stationary V-shaped knife 26, thereby severing projecting lengths of workpieces. These will fall into the bottom of the baling chamber and can readily be removed, since the baling chamber is readily accessible through the open shear gate 50.

Meantime the pressure of the holddown ram head on the workpieces will be relieved and the charging ram head will be advanced by the admission of hydraulic pressure toward the far end of cylinder 15 to push the workpieces forward to any desired extent for a second shearing cut.

When the desired length of workpieces project beyond the blades 26, the work will again be subjected to clamping pressure beneath the holddown ram head 35, and the shear ram head will again be advanced downwardly to shear the work. This operation is repeated until any desired number of cuts have been made in the workpieces. Additional workpieces can be added by retracting the charging ram and the holddown ram and the shear ram and repeating the same cycle of operations.

The operation as a press will now be described.

With the tamper cover 17 elevated approximately to the position indicated in dotted lines in FIG. 2 by the admission of hydraulic pressure to the lower end of the cover cylinder 20, work to be baled is introduced into the charging box 10. By manipulation of the tamper cover and the charging ram head, all or substantially all of the work will be gathered beneath the tamper cover in the forward end of the box. With the tamper cover held down by hydraulic pressure admitted to the cover cylinder 20 above the ram 19, the charging ram head will be advanced to force the work from the charging box into the baling chamber 25. The shear gate 50 will be closed during normal baling operation.

Assuming that the baling chamber has capacity to hold all of the material from the charging box, the charging ram head 12 will substantially overlie the knife 26 to constitute temporarily a wall of the baling chamber during the initial descent of the shear ram head 27. However, if all of the material from the charging box cannot be accommodated in the baling chamber or if, at the operation of the operator, a smaller bale is desired, in either case the advance of the charging ram head will stop behind the stationary shear blade 26 and the descent of the shear ram head will cause its shear knife 30 to operate across the stationary shear knife 26 to sever from the material in the baling chamber such material as is left in the charging box. Depending on circumstances, the material in the charging box may be anchored with the holddown ram head if desired.

When the shear ram head has moved across the stationary knife, it closes the end of the charging box. Thereupon the charging ram head may immediately be retracted and the tamper cover raised to receive another charge. The new charge can be loaded into the charging box while the baling operation continues in the baling chamber. Baling is accomplished by admitting hydraulic pressure to the outer end of cylinder 42, thereby advancing the baling ram 41 and the baling ram head 40 to compress the material beneath the still depressed shear ram head toward the ejection port 43 and against the ejection gate 44. Not until compression is complete is the ejection gate raised by admitting hydraulic pressure to the bottom of cylinder 46. The baling ram head may be backed off slightly if the pressure on the ejection is too high to permit it to be raised readily.

The V-shaped bottom of the charging box is of great advantage in ordinary baling as well as in shearing. It has already been explained that in a shearing operation the V-shaped bottom tends to line up the work longitudinally of the box and across the stationary blade 26. In baling, the inclination of the stationary blade obliquely across the path of movement of blade 30 assures the making of a shearing cut through the work and tends to prevent sticking.

The shear gate, normally used only when the apparatus is employed for shearing purposes, is also a desirable feature from the standpoint of the use of the device as a press, since it gives complete access to the interior of the baling chamber, facilitating replacement of the parts and replacement or sharpening of the stationary shear blade.

I claim:

1. Apparatus for working scrap metal comprising: a vertically movable shear head having a shear blade along a lower edge thereof; a horizontal feed bed terminating in a fixed shear blade cooperating with said movable shear blade; means including said shear head defining a baling chamber beneath said head for receiving scrap metal sheared by said blades; means separate from said head movable inwardly of said chamber for compacting scrap metal therein; and a gate movable between an operative closed baling position wherein it defines the wall of said chamber opposite said fixed shear blade and an open position wherein said apparatus serves only as a shear.

2. Apparatus for working scrap metal comprising: a vertically movable shear head having a shear blade along a lower edge thereof; a horizontal feed bed terminating in a fixed shear blade cooperating with said movable shear blade; means including said shear head defining a baling chamber beneath said head for receiving scrap metal sheared by said blades; means separate from said head movable inwardly of said chamber for compacting scrap metal therein; a gate movable between an operative closed baling position wherein it defines the wall of said chamber opposite said fixed shear blade and an open position wherein said apparatus serves only as a shear, and means to lock the gate in its closed position.

3. Apparatus for working scrap metal comprising: a vertically movable shear head having a shear blade along a lower edge thereof; a horizontal feed bed terminating in a fixed shear blade cooperating with said movable shear blade; means including said shear head defining a baling chamber beneath said head for receiving scrap metal sheared by said blades; means separate from said head movable inwardly of said chamber for compacting scrap metal therein; a gate movable between an operative closed baling position wherein it defines the wall of said chamber opposite said fixed shear blade and an open position wherein said apparatus serves only as a shear, and a movable discharge door for the chamber.

4. The combination with a charging box having a delivery end, of a baling chamber to which said charging box opens at said end, a charging ram having means for reciprocating it in the charging box toward and from the baling chamber, a shear ram having means for reciprocating it toward the baling chamber across the delivery end of the charging box, a baling ram having means for reciprocating it in the baling chamber transversely of the charging box and the shear ram, and relatively fixed and movable shear blades respectively fixed at the delivery end of the charging box and connected for movement with the shear ram for cooperation to sever material projecting from the open end of the charging box, said relatively fixed blade comprising a portion disposed obliquely with respect to the path of movement of the shear ram and the blade connected therewith, the charging box having a bottom portion with an oblique disposition corresponding to that of said fixed blade portion, the oblique position of the bottom portion of the charging box tending to bias work in the charging box toward a given position respecting the fixed blade, and a holddown ram head having means for actuating it across the open end of the charging box toward and from the fixed blade, the charging box having a V-shaped bottom and said fixed blade having a corresponding V-shaped contour and being disposed at the bottom of the charging box, the holddown ram head being operable to clamp work against the V-shaped bottom of the charging box, the baling chamber having a shear gate comprising a removable side wall section extending parallel to the path of movement of the baling ram for a distance equal to the major part of the length of the baling chamber and the width of the charging box positioned opposite the delivery end of the charging box.

5. The combination with a horizontal charging box and a charging ram head reciprocable therein and provided with means for its reciprocation, said charging box having an open top end and an open delivery end, and a baling chamber disposed at the open delivery end of the charging box, of a tamper cover overlying the charging box and movable to and from a position for closing at least a portion of the top of the charging box, a shear ram head having means for guiding it for vertical movement in the baling chamber across the open delivery end of the charging box, shear blades respectively movable with the shear ram head and fixed adjacent the open delivery end of the charging box, means for reciprocating the shear ram head, and a holddown ram disposed transversely of the open delivery end of the charging box and having means for moving it toward and from the bottom of the charging box adjacent the open delivery end thereof and adjacent said fixed shear blade, the said holddown ram head being disposed between the baling chamber and said portion of the charging box closed by the tamper cover, said tamper cover being adjacent the holddown ram head and having a pivotal connection with the charging box, and the means for actuating the tamper cover comprising cylinder and ram means.

References Cited in the file of this patent

UNITED STATES PATENTS

| | | |
|---|---|---|
| 402,457 | Kennedy | Apr. 30, 1889 |
| 1,409,726 | Kardos | Mar. 14, 1922 |
| 1,597,921 | Okins | Aug. 31, 1926 |
| 2,047,322 | Hazelton | July 14, 1936 |
| 2,203,884 | Stone | June 11, 1940 |
| 2,244,078 | Perlberg | June 3, 1941 |
| 2,591,970 | Seegers et al. | Apr. 8, 1952 |
| 2,865,284 | Thompson et al. | Dec. 23, 1958 |

FOREIGN PATENTS

| | | |
|---|---|---|
| 211,633 | Australia | Dec. 5, 1957 |